United States Patent
Nakagawa et al.

(10) Patent No.: US 7,680,016 B2
(45) Date of Patent: Mar. 16, 2010

(54) METHOD FOR DESIGNING AN OPTICAL PICKUP

(75) Inventors: Ryotaro Nakagawa, Daito (JP); Masanori Takahashi, Daito (JP); Hideaki Funakoshi, Daito (JP); Teruaki Sogawa, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 721 days.

(21) Appl. No.: 11/514,902

(22) Filed: Sep. 5, 2006

(65) Prior Publication Data

US 2007/0002717 A1    Jan. 4, 2007

(30) Foreign Application Priority Data

Sep. 6, 2005    (JP)    ............... 2005-257473

(51) Int. Cl.
    *G11B 7/00*    (2006.01)
(52) U.S. Cl. ............... 369/121; 369/44.12; 369/112.01; 369/120; 369/122
(58) Field of Classification Search ............... 369/44.11, 369/44.12, 44.14, 44.16, 44.23, 44.26, 44.27, 369/44.32, 112.01, 120, 121, 122; 250/201.5; 359/719, 822; 720/622
See application file for complete search history.

(56) References Cited

U.S. PATENT DOCUMENTS

| | | | | |
|---|---|---|---|---|
| 5,136,149 A * | 8/1992 | Fujiwara et al. | ........... | 250/201.5 |
| 5,517,474 A * | 5/1996 | Takamine | ................ | 369/44.32 |
| 5,777,960 A * | 7/1998 | Ohno | ........................ | 369/44.14 |
| 6,256,283 B1 * | 7/2001 | Fukakusa et al. | ........ | 369/112.01 |
| 6,501,710 B2 * | 12/2002 | Yokoyama et al. | ....... | 369/44.14 |
| 6,556,533 B1 * | 4/2003 | Fukakusa et al. | ....... | 369/112.19 |
| 6,778,473 B1 * | 8/2004 | Tomita et al. | ............. | 369/44.26 |
| 7,012,768 B2 * | 3/2006 | Hirose et al. | ................. | 359/822 |
| 7,253,968 B2 * | 8/2007 | Kimura et al. | .............. | 359/719 |
| 7,337,452 B2 * | 2/2008 | Freeman et al. | ............. | 720/662 |
| 2002/0006087 A1 * | 1/2002 | Matsuda | ................... | 369/44.23 |
| 2006/0120229 A1 * | 6/2006 | Nabeta | ..................... | 369/44.27 |
| 2007/0104076 A1 * | 5/2007 | Nakagawa et al. | .......... | 369/122 |

FOREIGN PATENT DOCUMENTS

JP    A-2003022543    1/2003

* cited by examiner

*Primary Examiner*—Thuy N Pardo
(74) *Attorney, Agent, or Firm*—Morgan Lewis & Bockius LLP

(57) ABSTRACT

A method for designing an optical pickup is provided. The optical pick includes a monolithic laser diode that emits a laser light beam for DVD recording and a laser light beam for CD playback, two photodetective portions, and an objective lens, for each of the emitting portions of the monolithic laser diode for emitting the DVD recording and CD playback laser light beams respectively, the specification of the error of the emission direction thereof is determined according to the following formula: $|(\Delta\theta\perp_1 \times \Delta\theta_1 \times Dpd_1/Dob_1 - \Delta\theta\perp_2 \times \Delta\theta_2 \times Dpd_2/Dob_2) \times Kpd_2| \leq \alpha$, where, "1" corresponds to the DVD recording laser light beam and "2" corresponds to the CD playback laser light beam, $\Delta\theta\perp$ represents the emission angle; $\Delta\theta$ represents the sensitivity; Dob represents the diameter of the light beam; Dpd represents the diameter of the spot formed by the light beam; Kpd represents the sensitivity; and α represents the tolerable value.

1 Claim, 14 Drawing Sheets

METHOD FOR DESIGNING AN OPTICAL PICKUP

This application is based on Japanese Patent Application No. 2005-257473 filed on Sep. 6, 2005, the contents of which are hereby incorporated by reference.

BACKGROUND OF THE INVENTION

1. Field of the Invention

The present invention relates to a method for designing an optical pickup incorporated in an optical disc apparatus.

2. Description of Related Art

An optical disc apparatus that plays back from and records to an optical disc such as a CD or DVD incorporates an optical pickup. Conventionally, different optical pickups have been developed to cope with recording to and playback from different types of discs.

For example, a DVD recorder employs an optical pickup that can handle recording to a DVD and playback from a CD. FIGS. 1 and 2 show the optical system of an optical pickup for a DVD recorder, FIG. 1 showing it as viewed from the side and FIG. 2 showing it as viewed from the top. It should be noted that the coordinate axes (X, Y, and Z) shown in these diagrams are common to other diagrams wherever applicable.

A laser diode 1 emits laser light. The structure of the laser diode 1 is shown in FIG. 3. A submount 5 is fixed on a projection 4 formed to project from a disc-shaped stem 3. In an upper end part of the submount 5, a monolithic laser diode (hereinafter "monolithic LD") 6 is arranged. Moreover, on the submount 5, behind the monolithic LD 6, a PIN diode 7 is formed. The monolithic LD 6 emits laser light of different wavelengths, namely at a DVD wavelength (in a 650 nm band) and at a CD wavelength (in a 780 nm). To achieve control, called APC (automatic power control), for keeping the output of the laser light emitted from the monolithic LD 6 constant, the PIN diode 7 receives the laser light emitted rearward from the monolithic LD 6. The stem 3 is penetrated by a plurality of terminals 2, which are connected by leads 8 to the monolithic LD 6 and to the PIN diode 7, which thus receive their drive current via the terminals 2.

FIG. 4 shows the monolithic LD 6 as viewed from the direction in which laser light is emitted (from the direction indicated by arrow L in FIG. 3). The monolithic LD 6 has, integrated into a single chip, a laser structure capable of emitting at two wavelengths, namely at a DVD wavelength (in a 650 nm band) and at a CD wavelength (in a 780 nm). The monolithic LD 6 has a common negative electrode 9, a GaAs substrate 10, an active layer 11, a DVD-side p electrode 14, and a CD-side p electrode 15. On the GaAs substrate 10, the individual layers including the active layer 11 are laid (downward in the diagram) on one another, and, to the lowermost layer thereof, the DVD-side p electrode 14 and the CD-side p electrode 15 are connected. In the active layer 11, a DVD-side laser emitting portion 12 and a CD-side laser emitting portion 13 are formed. To the DVD-side p electrode 14, a DVD-side positive electrode 16 formed on the submount 5 is connected, and, to the CD-side p electrode 15, a CD-side positive electrode 17 formed on the submount 5 is connected. Moreover, to the GaAs substrate 10, the common negative electrode 9 is connected. When electric current is passed through the electrodes, the DVD-side laser emitting portion 12 emits laser light (in a 650 nm wavelength band) for DVD recording, and the CD-side laser emitting portion 13 emits laser light (in a 780 nm wavelength band) for CD playback. The laser light for DVD recording has a higher output than the laser light for CD playback. The positions of the DVD-side laser emitting portion 12 and the CD-side laser emitting portion 13 are determined by a semiconductor wafer process, and hence with high accuracy.

Emitted from the laser diode 1 structured as described above, the laser light for DVD recording or CD playback is then split, by a grating 18, into one main beam and two sub beams. The laser light then passes through a PBS (polarizing beam splitter) 19 and then through a quarter-wave plate 20, is then reflected on a upward-directing mirror 21, and then enters a collimator lens 22. By the collimator lens 22, the laser light is formed into parallel light, and then the laser light enters an aperture 23. The aperture 23 is wavelength-selective so as to let the laser light for DVD recording (in a 650 nm wavelength band) pass therethrough intact but restrict the aperture for the laser light for CD playback (in a 780 nm wavelength band). The laser light that has passed through the aperture 23 is focused on a recording surface of a disc 25 by an objective lens 24.

The laser reflected from the disc 25 passes through the objective lens 24, then through the aperture 23, and then through the collimator lens 22, and is then reflected on the upward-directing mirror 21. The laser light then passes through the quarter-wave plate 20, and then enters the PBS 19. The laser light that enters the PBS 19 here has passed through the quarter-wave plate 20 twice, and is therefore now reflected by the PBS 19 to enter a cylindrical lens 26.

As shown in FIG. 5A, the cylindrical lens 26 has a concave cylindrical surface, and is arranged so that this concave cylindrical surface faces the PBS 19. Moreover, as shown in FIG. 5B, which shows the cylindrical lens 26 as viewed from the direction indicated by arrow A in FIG. 2, the cylindrical lens 26 is arranged so that its central generatrix S lies on an XY plane and is inclined 45° from the X direction.

Having passed through the cylindrical lens 26 described above, the laser light is then received by a photodetector 27. FIG. 6 shows the photodetector 27 as viewed from the direction indicated by arrow B in FIG. 2. The photodetector 27 has, formed on a single silicon substrate 28, a plurality of photodetective portions 29 to 34 that cope with laser light of two wavelengths. More specifically, one photodetective portion 30 having its photodetective surface divided into four parts receives the main beam of the laser light for DVD recording; two photodetective portions 29 and 31 having their photodetective surfaces each divided into two parts receive the sub beams of the laser light for DVD recording; one photodetective portion 33 having its photodetective surface divided into four parts receives the main beam of the laser light for CD playback; and two photodetective portions 32 and 34 having their photodetective surfaces undivided receive the sub beams of the laser light for CD playback. These photodetective portions individually convert the laser light they have received into electrical signals, based on which the RF signal recorded on the disc is reproduced and a focus error signal and a tracking error signal are produced.

Inconveniently, however, the optical pickup configured as described above has the following disadvantages.

FIG. 7 is a diagram showing how the monolithic LD 6 described above emits laser light. The intensity distribution of the laser light emitted from the DVD-side laser emitting portion 12 or the CD-side laser emitting portion 13 reflects how the laser emitting portion itself is shaped in the active layer 11, and thus has an elliptic pattern elongate in the direction perpendicular to the active layer 11. The intensity distribution of the laser light exhibits a Gaussian distribution both in the directions parallel and perpendicular to the active layer 11, and the angle encompassing the part of such a distribution pattern where the light intensity is equal to or higher than a predetermined proportion (for example, one half) of its peak value is called the radiation angle. In the following description, the radiation angle ($\theta$// in FIG. 7) in the direction parallel to the active layer 11 will be referred to as the parallel radiation angle, and the radiation angle ($\theta\perp$ in FIG. 7) in the direction perpendicular to the active layer 11 will be referred to as the perpendicular radiation angle. FIG. 8 shows the light intensity distribution in the direction perpendicular to the active layer 11, as observed with the laser light for CD playback and the laser light for DVD recording, the latter having a higher output than the former. With the laser light for DVD recording, which has the higher output, the perpendicular radiation angle is small, resulting in a sharper distribution pattern; by contrast, with the laser light for CD playback, which has the lower output, the perpendicular radiation angle is large, resulting in a gentler distribution pattern.

Here, as shown in FIG. 9, the direction (hereinafter referred to simply as "emission direction) in which the intensity of the laser light emitted from each emitting portion of the monolithic LD 6 has the peak value may deviate, in the direction perpendicular to the active layer 11 of the monolithic LD 6, from the reference axis along the optical path leading from each emitting portion of the monolithic LD 6 to the center of the photodetective portion 30 (for the DVD main beam) or the photodetective portion 33 (for the CD main beam) of the photodetector 27. In the following description, the angle of this deviation will be referred to as the emission angle ($\Delta\theta\perp$ in FIG. 9). This deviation is attributable to an error in the emission direction at each emitting portion resulting from a fabrication error in the monolithic LD 6, and to an error in the fitting of the monolithic LD 6 itself resulting from an error in the submount 5 or the stem 3.

The intensity distribution of the laser light immediately after exiting from the objective lens 24, as observed when the emission direction deviates downward in the X-axis direction from the reference axis as shown in FIG. 9, is shown in FIG. 10A. Moreover, with respect to both of a case where the emission direction is not deviated from the reference axis and a case where it is deviated as shown in FIG. 9, the cross-section, as viewed in the Z-axis direction, of the intensity distribution of the laser light immediately after exiting the objective lens 24 is shown in FIG. 10B. In FIG. 10, the symbol "Dob" represents the beam diameter of the laser light immediately after exiting the objective lens 24. As these diagrams show, when the emission direction of the laser light deviates in the X-axis direction from the reference axis, the intensity distribution of the laser light immediately after exiting the objective lens 24, as having been restricted by the aperture 23 and the member that keeps the objective lens 24 in position, becomes lopsided in the Y-axis direction, and thus the gravity center of the light intensity deviates in the Y-axis direction.

As the light intensity of the laser light immediately after exiting the objective lens 24 deviates in this way, so the light intensity distribution at the photodetective portions of the photodetector 27 deviates. With respect to a case where the emission direction deviates downward in the X-axis direction from the reference axis as shown in FIG. 9, the light intensity distribution and the gravity center (indicated with the symbol "×") of the light intensity as observed at the photodetective portion 30 (for the DVD main beam) and the photodetective portion 33 (for the CD main beam) are shown in FIG. 11A. As this diagram shows, when the emission direction of the laser light deviates in the X-axis direction from the reference axis, the light intensity distribution at the photodetective portions becomes lopsided in the Y-axis direction, and thus the gravity center of the light intensity deviates in the Y-axis direction from the center of the photodetective portions.

Here, as shown in FIG. 11A, let the four photodetective parts of the photodetective portion 30 be represented by "a", "b", "c", and "d", and let the four photodetective parts of the photodetective portion 33 be represented by "A", "B", "C", and "D". Then, the photodetector 27 needs to be adjusted so that the light reception balances expressed by formulae (1) and (2) below equal, ideally, zero.

$$PDY_1 = ((I_a + I_b) - (I_c + I_d))/(I_a + I_b + I_c + I_d) \times 100 \quad (1)$$

$$PDY_2 = ((I_A + I_B) - (I_C + I_D))/(I_A + I_B + I_C + I_D) \times 100 \quad (2)$$

where $PDY_1$ (%) represents the light reception balance at the DVD photodetective portion; $PDY_2$ (%) represents the light reception balance at the CD photodetective portion; and I represents the light intensity at the photodetective part i.

The state that appears when an adjustment is made in the state shown in FIG. 11A by moving the photodetector 27 in the Y-axis direction so that the gravity of center of the light intensity in the DVD photodetective portion 30 is located at the center of the photodetective portion 30 is shown in FIG. 11B. This makes the light reception balance (formula (1) above) in the DVD photodetective portion 30 equal to zero, but leaves the gravity center of the light intensity in the CD photodetective portion 33 deviated from the center of the photodetective portion 33, and accordingly leaves the light reception balance there (formula (2) above) non-zero. This is called the remnant light reception balance deviation. Due to errors in the emission direction of the emitting portions of the monolithic LD and errors in the fitting of the monolithic LD itself, the laser emission angle varies from one individual optical pickup to another, and, depending on the magnitude of the emission angle, the deviation of the gravity center of the light intensity in the state shown in FIG. 11A may be so great that, after the adjustment of the photodetector, the just-mentioned remnant light reception balance deviation exceeds the tolerable range. When the remnant light reception balance deviation exceeds the tolerable range, the reading of the disc and the servo operation are adversely affected, and this necessitates a further adjustment. Since the remnant light reception balance deviation cannot be eliminated through an adjustment involving the rotation of the photodetector, however, the optical pickup is then evaluated as defective, and this leads to a lower yield. Instead, an adjustment may be made in part of the optical system other than the photodetector, but this leads to increased cost.

Incidentally, JP-A-2003-22543 discloses a method for adjusting light reception balance whereby a deviation of light reception balance attributable to a deviation of the direction of laser emission from an LD from the reference axis running in the direction parallel to the active layer thereof is adjusted by inclining the LD.

SUMMARY OF THE INVENTION

An object of the present invention is to provide a method for designing an optical pickup that permits yield enhancement and cost reduction in optical pickups.

To achieve the above object, according to the present invention, in a method for designing an optical pickup including:
  a monolithic laser diode that emits
    a first light beam for recording to a disc and
    a second light beam for playing back from a disc or for recording to a disc;
  a substrate;
  a first photodetective portion provided on the substrate for receiving the first light beam;

a second photodetective portion provided on the substrate for receiving the second light beam; and
an objective lens,
for each of the emitting portions of the monolithic laser diode for emitting the first and second light beams respectively, the specification of the error of the emission direction thereof is determined according to at least one of formulae (A) and (B) below:

$$|(\Delta\theta\perp_1 \times \Delta\theta_1 \times Dpd_1/Dob_1 - \Delta\theta\perp_2 \times \Delta\theta_2 \times Dpd_2/Dob_2) \times Kpd_2| \leq \alpha \quad (A)$$

$$|(\Delta\theta\perp_1 \times \Delta\theta_1 \times Dpd_1/Dob_1 - \Delta\theta\perp_2 \times \Delta\theta_2 \times Dpd_2/Dob_2) \times Kpd_1| \leq \alpha \quad (B)$$

where, let the variables corresponding to the first light beam be followed by a subscript "1" and variables corresponding to the second light beam be followed by a subscript "2", $\Delta\theta\perp$ represents the emission angle;

$\Delta\theta$ represents the sensitivity, to the emission angle, of the deviation of the gravity center of the intensity of the light exiting from the object lens;

Dob represents the diameter of the light beam immediately after exiting from the object lens;

Dpd represents the diameter of the spot formed by the light beam on the photodetective portion;

Kpd represents sensitivity of the deviation of light reception balance to the deviation of the photodetective portion; and $\alpha$ represents the tolerable value for the remnant deviation of light reception balance.

When the specification of the error of the emission direction for each of the emitting portions of the monolithic laser diode is determined, it is preferable to take into consideration the variation of the sensitivity, to the emission angle, of the deviation of the gravity center of the intensity of the light exiting from the object lens.

With this method, it is possible to reduce the number of optical pickups that are evaluated as defective due to the remnant light reception balance deviation exceeding the tolerable range after the position adjustment of their photodetective portions. Thus, it is possible to achieve yield enhancement. Moreover, it is no longer necessary to make an adjustment to bring to within the tolerable range the remnant light reception balance deviation exceeding the tolerable range after the position adjustment of their photodetective portions. Thus, it is possible to achieve cost reduction in optical pickups.

DETAILED DESCRIPTION OF PREFERRED EMBODIMENTS

Hereinafter, an embodiment of the present invention will be described with reference to the drawings. The following description deals with, as an example, the optical pickup for a DVD recorder that has been discussed previously in connection with the related art. The optical system of the optical pickup is just as described previously and shown in FIGS. 1 and 2, and therefore no description thereof will be repeated.

Figure 9:
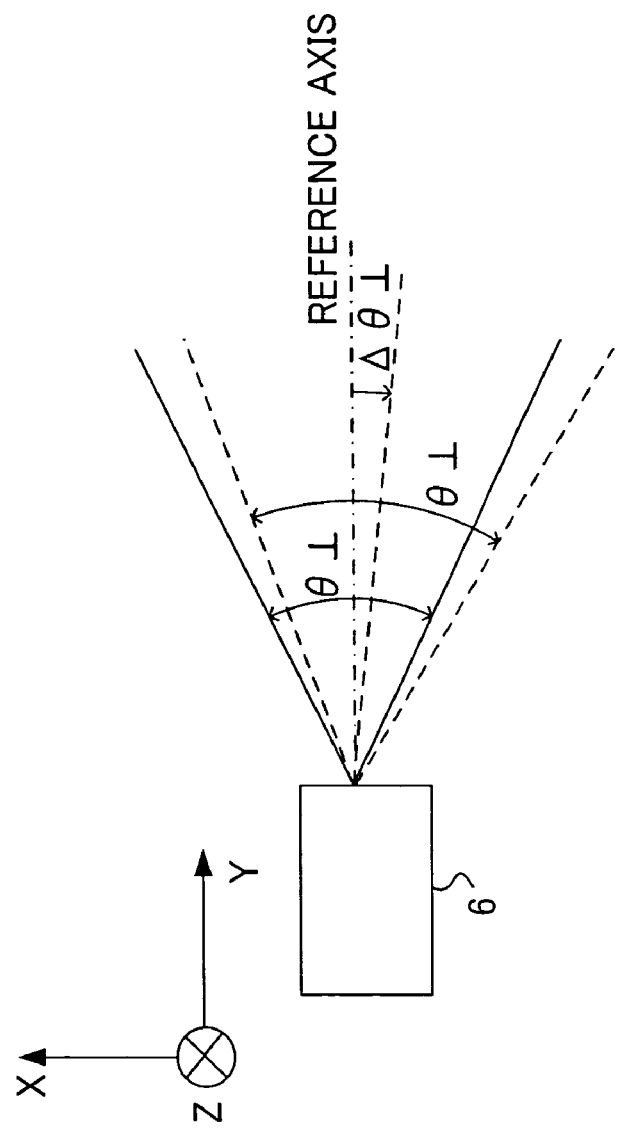
FIG. 9 is a diagram showing a deviation of the emission direction of the laser light emitted from the monolithic LD.

A description will be given below of the derivation of a formula that represents the value of the previously described remnant light reception balance deviation when, as shown in FIG. 9, the emission direction of the laser light emitted from each emitting portion of the monolithic LD 6 deviates in the direction perpendicular to the active layer 11 of the monolithic LD 6 from the reference axis along the optical path leading from each emitting portion of the monolithic LD 6 to the center of the photodetective portion 30 (for the DVD main beam) or the photodetective portion 33 (for the CD main beam) of the photodetector 27.

Figure 10B:
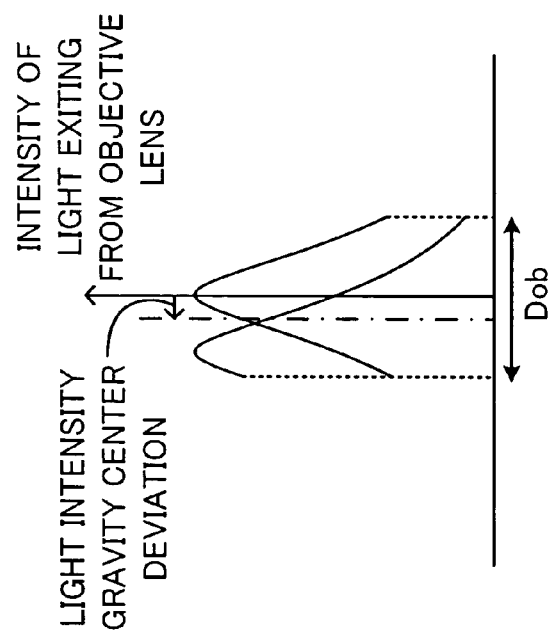
FIG. 10B is a cross-sectional view, as viewed in the Z-axis direction, showing, with respect to both of a case where the emission direction is not deviated from the reference axis and a case where it is deviated, the intensity distribution of the laser light immediately after exiting the objective lens.
Figure 10A:
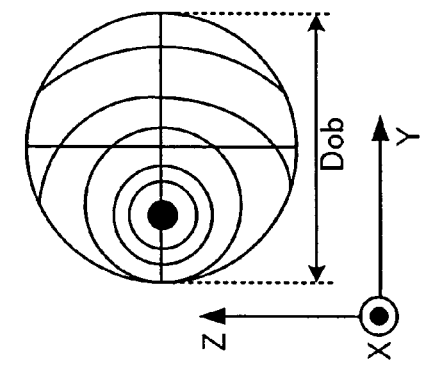
FIG. 10A is a diagram showing the intensity distribution of the laser light immediately after exiting from the objective lens, as observed when the emission direction deviates downward in the X-axis direction from the reference axis.

As described previously, when the laser emission direction deviates from the reference axis, the light intensity gravity center immediately after exiting from the objective lens 24 deviates as shown in FIGS. 10A and 10B. Here, let $\Delta\theta$ represent the ratio of the variation of the deviation of the light intensity gravity center immediately after exiting from the objective lens 24 to the variation of the deviation of the laser emission direction from the reference axis, that is, the variation of the emission angle. Then, the deviation of the light intensity gravity center immediately after exiting from the objective lens 24 is given by $\Delta\theta\perp\times\Delta\theta$.

Figure 11A:
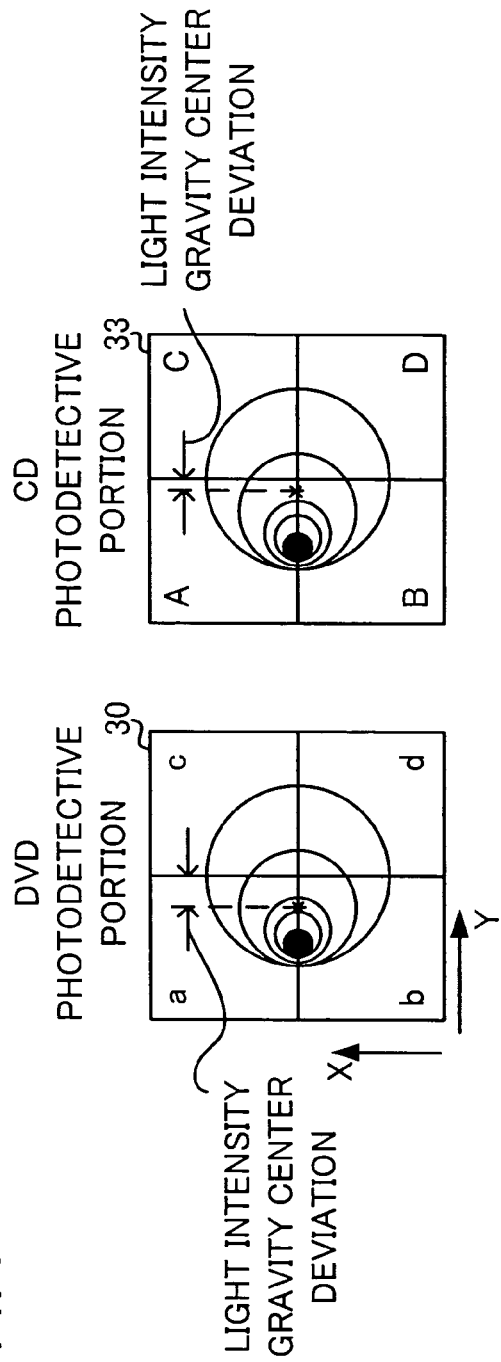
FIG. 11A is a diagram showing the light intensity distribution and the gravity center of the light intensity as observed at the DVD main beam photodetective portion and the CD main beam photodetective portion when the emission direction of the laser light deviates downward in the X-axis direction from the reference axis.

When the light intensity gravity center immediately after exiting from the objective lens 24 deviates, accordingly, as shown in FIG. 11A, the light intensity gravity center in the photodetective portion 30 (for the DVD main beam) and in the photodetective portion 33 (for the CD main beam) deviates from the center of those emitting portions. The deviation of the light intensity gravity center is proportional to the diameter of the laser light, and hence, let Dob represent the laser diameter immediately after exiting from the objective lens 24 and let Dpd represent the laser spot diameter on the photodetective portion 30 or 33, then, the deviation of the light intensity gravity center on the photodetective portion 30 or 33 is given by $\Delta\theta\perp\times\Delta\theta\times Dpd/Dob$.

Figure 11B:
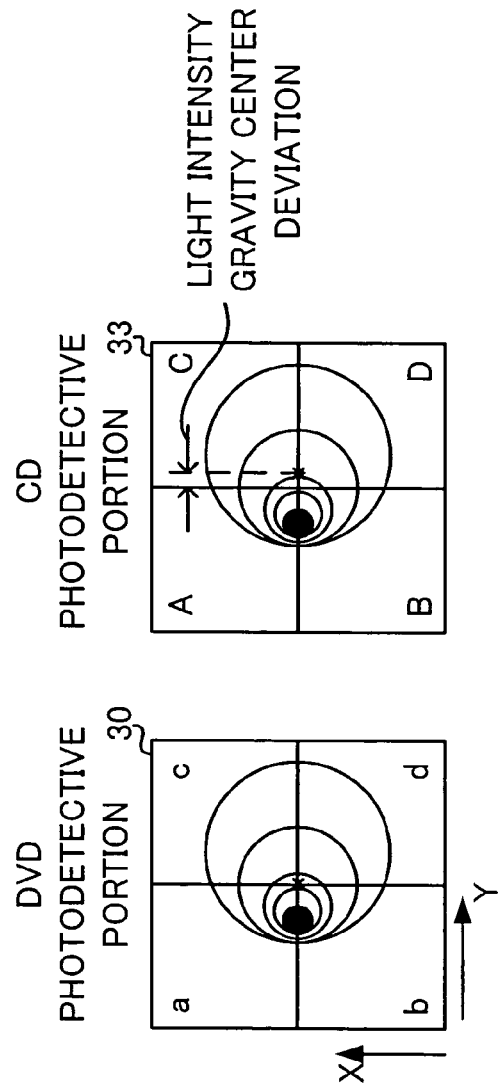
FIG. 11B is a diagram showing the state that appears when an adjustment is made in the state shown in FIG. 11A by moving the photodetector in the Y-axis direction so that the gravity of center of the light intensity in the DVD main beam photodetective portion is located at the center of the photodetective portion.

Next, consider a case where, as shown in FIG. 11B, an adjustment is made by moving the photodetector 27 in the Y-axis direction so that the light intensity gravity center in the DVD photodetective portion 30 is located at the center of the photodetective portion 30. In this case, the deviation of the light intensity gravity center in the CD photodetective portion 33 from the center thereof as observed after the adjustment of the photodetector 27 is expressed as $\Delta\theta\perp_2\times\Delta\theta_2\times Dpd_2/Dob_2 - \Delta\theta\perp_1\times\Delta\theta_1\times Dpd_1/Dob_1$. Here, a subscript "1" indicates that the variable preceding it corresponds to the DVD recording laser light and a subscript "2" indicates that the variable preceding it corresponds to the CD playback laser light. This applies throughout the following description.

Now, the ratio of the variation of the light reception balance (formula (2) noted previously) to the variation of the Y-axis direction position of the CD photodetective portion 33 is defined as the sensitivity $Kpd_2$ of the deviation of the light reception balance to the deviation of the photodetective portion. Then, the remnant light reception balance deviation in the CD photodetective portion 33 is given by $(\Delta\theta\perp_2\times\Delta\theta_2\times Dpd_2/Dob_2 - \Delta\theta\perp_1\times\Delta\theta_1\times Dpd_1/Dob_1)\times Kpd_2$.

Usually, an adjustment is made, as described above, by moving the photodetector 27 so that the light reception balance in the DVD photodetective portion 30 equals zero; axis instead, however, an adjustment may be made by moving the photodetector 27 in the Y-direction so that the light intensity gravity center in the CD photodetective portion 33 is located at the center thereof and thus that the light reception balance in the CD photodetective portion 33 equals zero. In this case, through the same reasoning as used above, the remnant light reception balance deviation in the DVD photodetective portion 30 is given by $(\Delta\theta\perp_1\times\Delta\theta_1\times Dpd_1/Dob_1 - \Delta\theta\perp_2\times\Delta\theta_2\times Dpd_2/Dob_2)\times Kpd_1$.

Here, the tolerable value of the remnant light reception balance deviation that does not adversely affect the reading from a disc or the servo operation is about 25%; however, when consideration is given to the reliability test conducted after the shipment of the optical pickup and the deterioration of accuracy with time, the tolerable value of the remnant light reception balance deviation at the time of the adjustment of the photodetector needs to be 7%.

Accordingly, in a case where an adjustment is made by moving the photodetector 27 so that the light reception balance in the DVD photodetective portion 30 equals zero, it is necessary that formula (3) below be fulfilled.

$$|(\Delta\theta\perp_1\times\Delta\theta_1\times Dpd_1/Dob_1 - \Delta\theta\perp_2\times\Delta\theta_2\times Dpd_2/Dob_2)\times Kpd_2| \leq 7 \quad (3)$$

On the other hand, in a case where an adjustment is made by moving the photodetector 27 so that the light reception balance in the CD photodetective portion 33 equals zero, it is necessary that formula (3) below be fulfilled.

$$|(\Delta\theta\perp_1\times\Delta\theta_1\times Dpd_1/Dob_1 - \Delta\theta\perp_2\times\Delta\theta_2\times Dpd_2/Dob_2)\times Kpd_1| \leq 7 \quad (4)$$

Now, how an optical pickup is designed according to formulae (3) and (4) will be described by way of practical examples.

Figure 1:
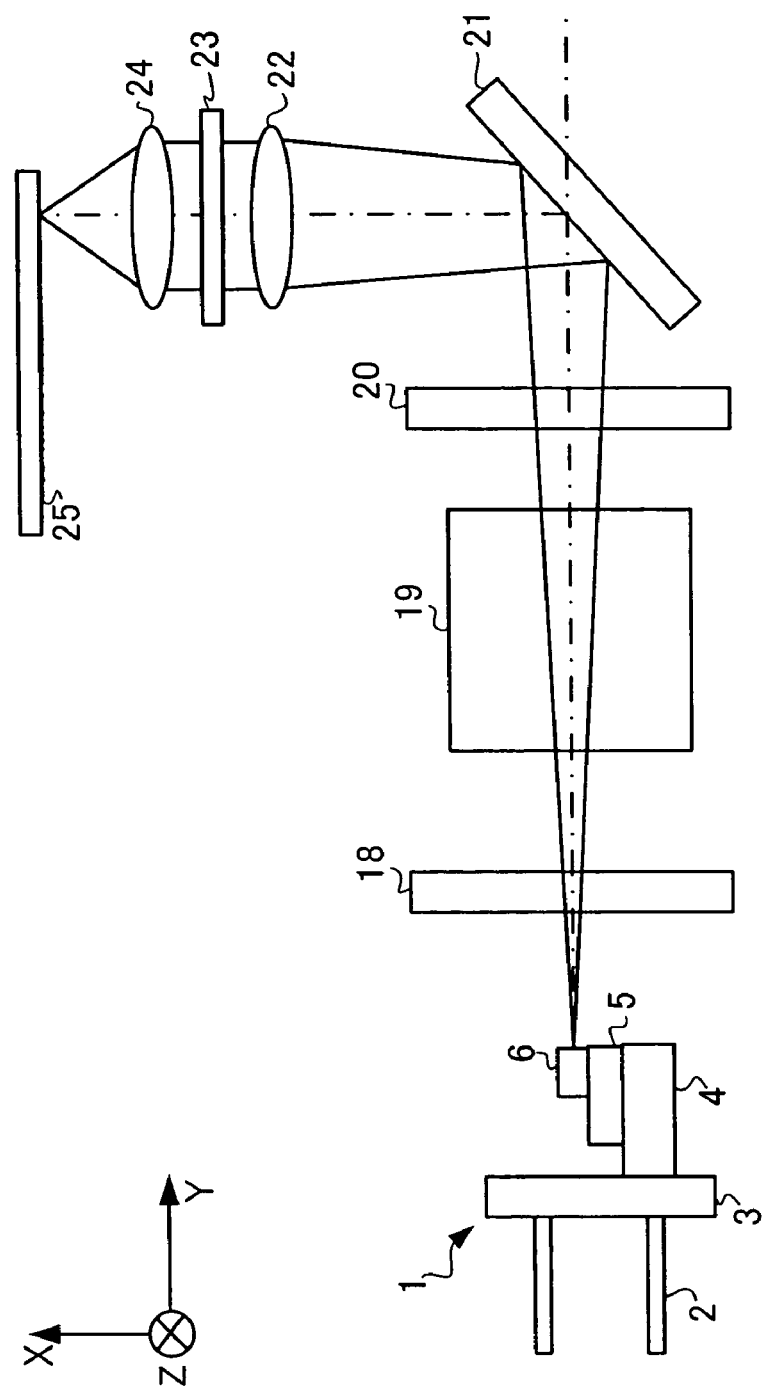
FIG. 1 is a side view of the optical system in a conventional optical pickup and in an optical pickup according to the invention.
Figure 2:
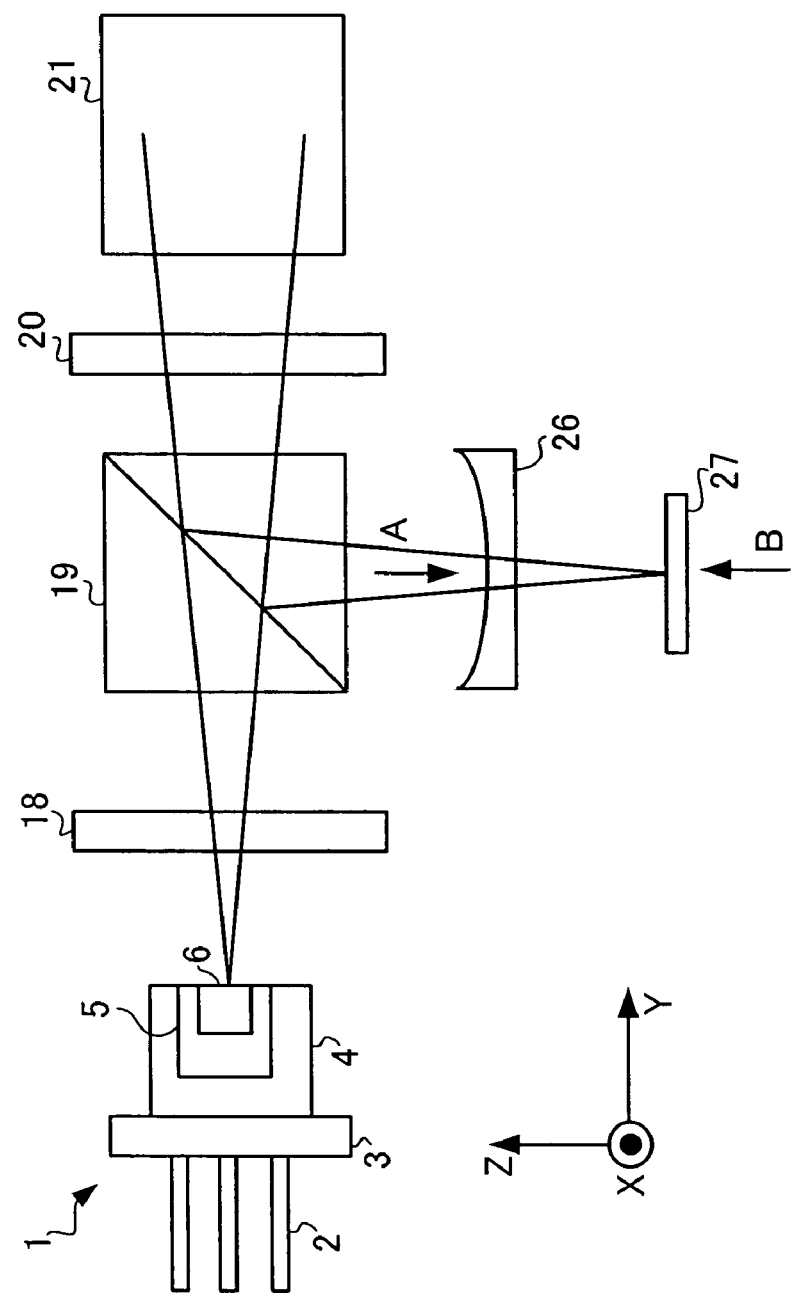
FIG. 2 is a top view of the optical system in a conventional optical pickup and in an optical pickup according to the invention.
Figure 3:
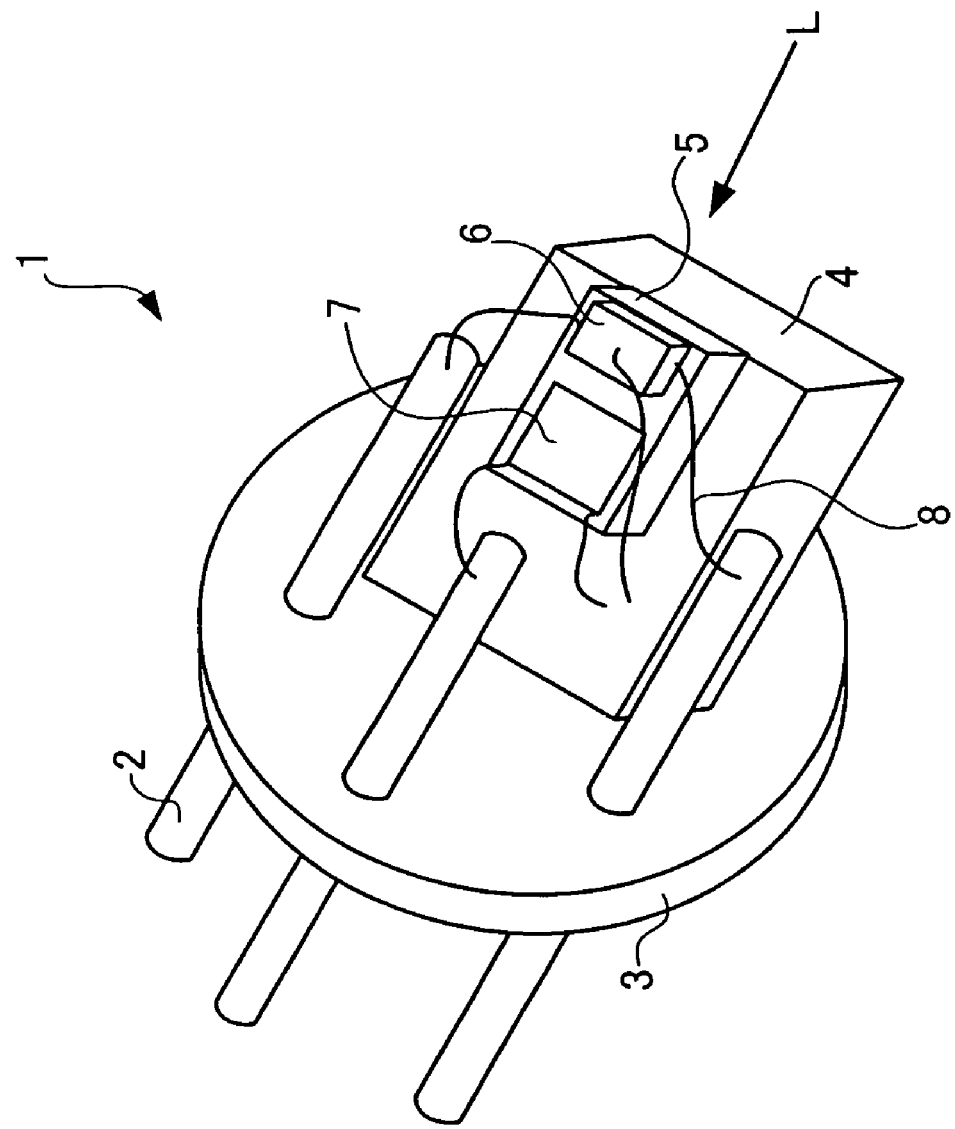
FIG. 3 is a perspective view of a laser diode.
Figure 4:
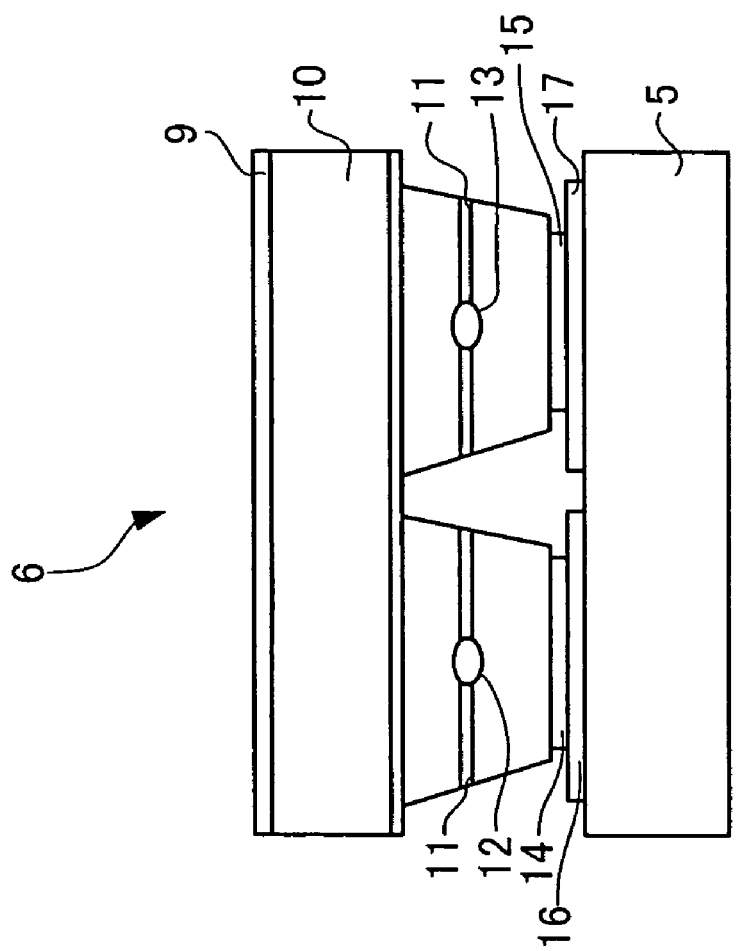
FIG. 4 is a diagram showing a monolithic LD as viewed from the direction in which laser light is emitted.
Figure 5B:
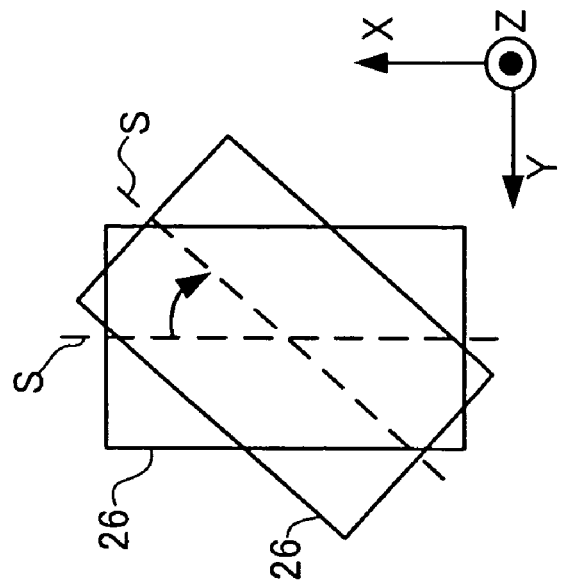
FIG. 5B is a plan view of the cylindrical lens.
Figure 5A:
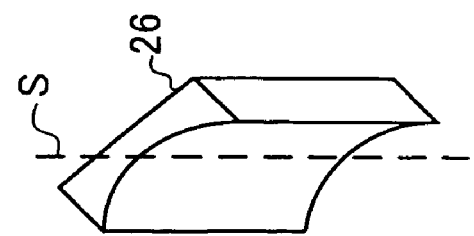
FIG. 5A is a perspective view of a cylindrical lens.
Figure 6:
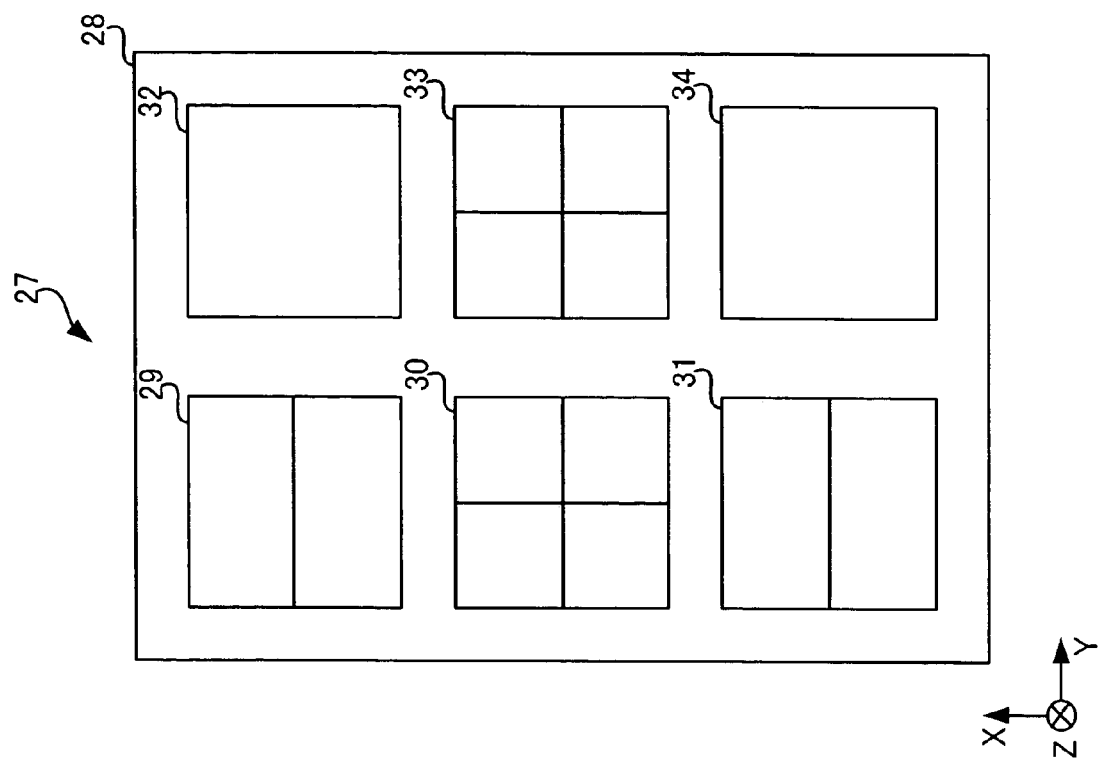
FIG. 6 is a diagram showing a photodetector.
Figure 7:
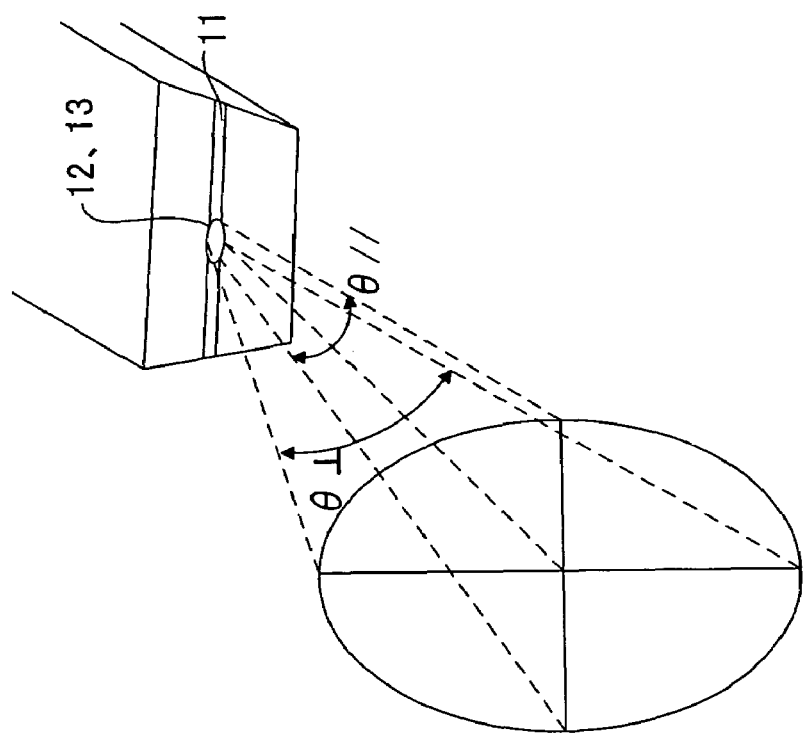
FIG. 7 is a diagram showing how the monolithic LD emits laser light.

Suppose here that an optical system as shown in FIGS. 1 and 2 is being designed and test-fabricated. The laser diameter Dob immediately after exiting from the objective lens 24 depends on the numerical aperture and the focal length of the objective lens 24; here, with the DVD recording laser light, the laser diameter was $Dob_1 = 4$ [mm], and, with the CD playback laser light, the laser diameter was $Dob_2 = 3.14$ [mm]. The spot diameter Dpd at the photodetective portion of the photodetector 27 varies with the distance of the cylindrical lens 26 from the photodetector 27; here, in the DVD photodetective portion 30, the spot diameter was $Dpd_1 = 0.1$ [mm], and, on the CD photodetective portion 33, the spot diameter was $Dpd_2 = 0.08$ [mm].

Figure 12:
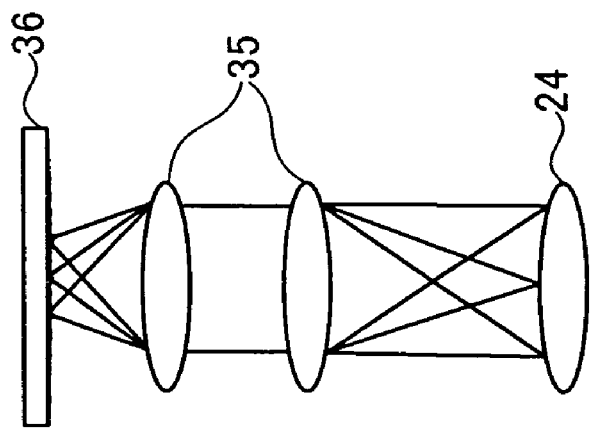
FIG. 12 is a diagram showing the optical system for measuring the intensity distribution of the laser light immediately after exiting from the objective lens.
Figure 13:
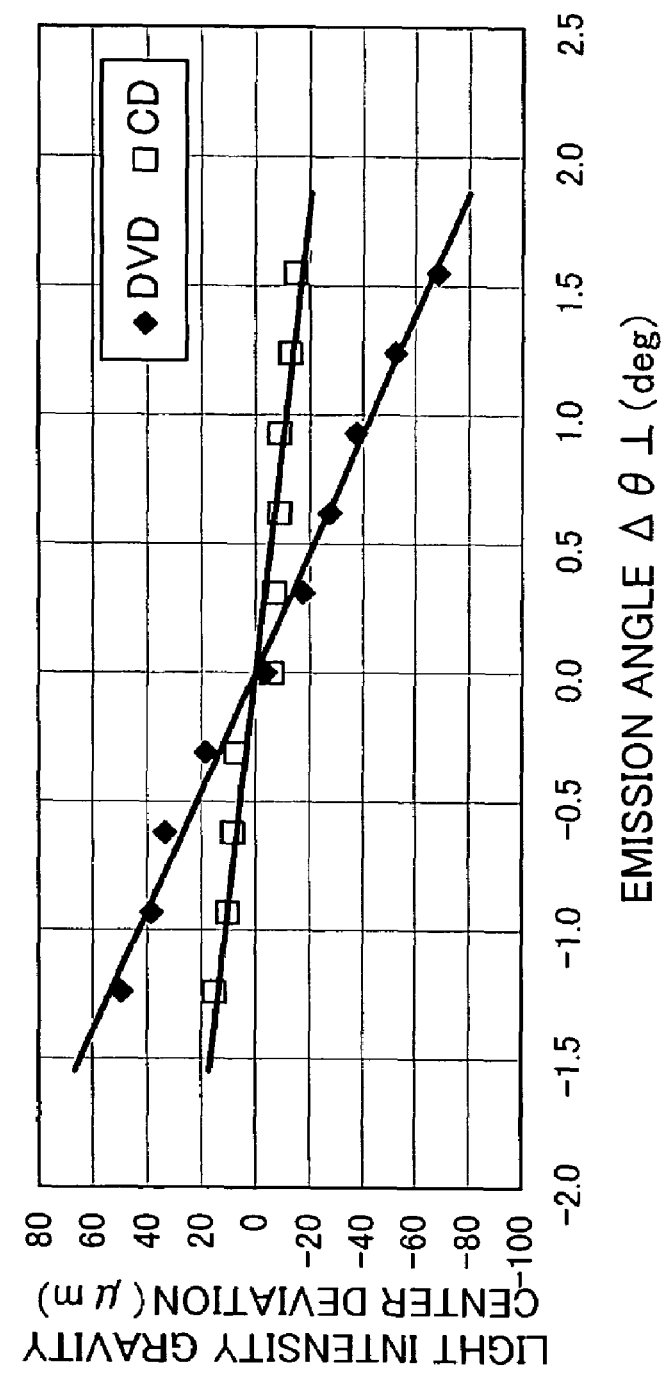
FIG. 13 is a graph showing the relationship between the emission angle and the deviation of the gravity center of the intensity of the laser light immediately after exiting the objective lens.

With the optical system configured as described above, the sensitivity $\Delta\theta$, to the emission angle, of the deviation of the gravity center of the intensity of the light exiting from the objective lens was measured. The emission angle can be varied on a simulation basis by moving the objective lens 24 in the Y-axis direction as viewed in FIG. 1; thus, while the objective lens 24 is swung in the Y-axis direction as viewed in FIG. 1, the laser light intensity distribution and the light intensity gravity center deviation as observed immediately after exiting from the objective lens 24 were measured. The measurement of the laser light intensity distribution and the light intensity gravity center deviation as observed immediately after exiting from the objective lens 24 was conducted by the use of an optical system including a CCD 36 and a microscope lens system 35 as shown in FIG. 12; specifically, the image on the surface of the objective lens 24 was imaged through the optical system on the CCD 36, and the intensity of the image was measured. From the monolithic LD 6 was emitted, at a time, the DVD recording laser light (with an output of 135 [mW]) and, at another time, the CD playback laser light (with an output of 8 [mW]), and, while the objective lens 24 is swung in the Y-axis direction as viewed in FIG. 1, the laser light intensity gravity deviation immediately after exiting the objective lens 24 was measured. An example of the results of the measurement is shown in FIG. 13. It should be noted that along the horizontal axis of the graph shown in FIG. 13 is taken the amount of swing of the objective lens 24 as converted into the equivalent emission angle according to formula (5) below.

$$\Delta\theta\perp = \tan^{-1}(Y/f) \quad (5)$$

where Y represents the amount of swing of the objective lens, and f represents the focal length of the collimator lens.

Figure 8:
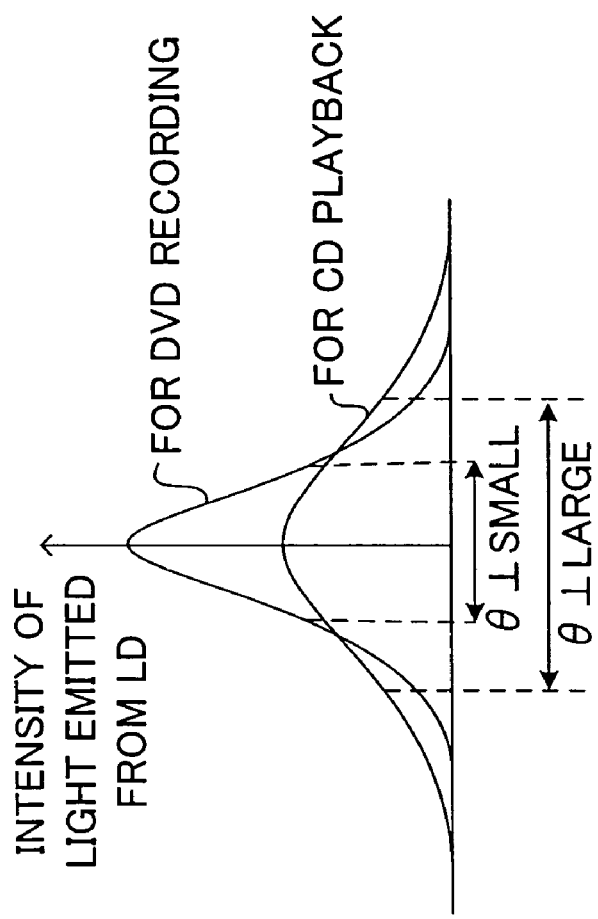
FIG. 8 is a diagram showing the intensity distribution of the laser light emitted from the monolithic LD, as observed in the direction perpendicular to the active layer.

The gradient of each regression line in the graph represents the sensitivity $\Delta\theta$, to the emission angle, of the deviation of the gravity center of the intensity of the light exiting from the objective lens; specifically, with the DVD recording laser light, $\Delta\theta_1 = 43.1$ [μm/deg], and, with the CD playback laser light, $\Delta\theta_2 = 11.0$ [μm/deg]. Here, as described earlier and shown in FIG. 8, the light intensity distribution in the direction perpendicular to the active layer 11 of the monolithic LD 6 shows the following features: with the DVD recording laser light, which has the higher output, the perpendicular radiation angle is small, resulting in a sharper distribution pattern; with the laser light for CD playback, which has the lower output, the perpendicular radiation angle is large, resulting in a gentler distribution pattern. Accordingly, the intensity distribution of the laser light immediately after exiting from the objective lens 24, as narrowed around the peak value of the light intensity, exhibits a sharp distribution pattern with the DVD recording laser light and a gentle distribution pattern with the CD playback laser light. Hence, so long as the emission angles of the DVD recording laser light and of the CD playback laser light vary equally, the variation of the deviation of the light intensity gravity center in the light intensity distribution immediately after exiting from the objective lens 24 is larger with the DVD recording laser light than with the CD playback laser light, and the sensitivity $\Delta\theta$, to the emission angle, of the deviation of the gravity center of the intensity of the light exiting from the objective lens is greater with the DVD recording laser light than with the CD playback laser light.

Figure 14:
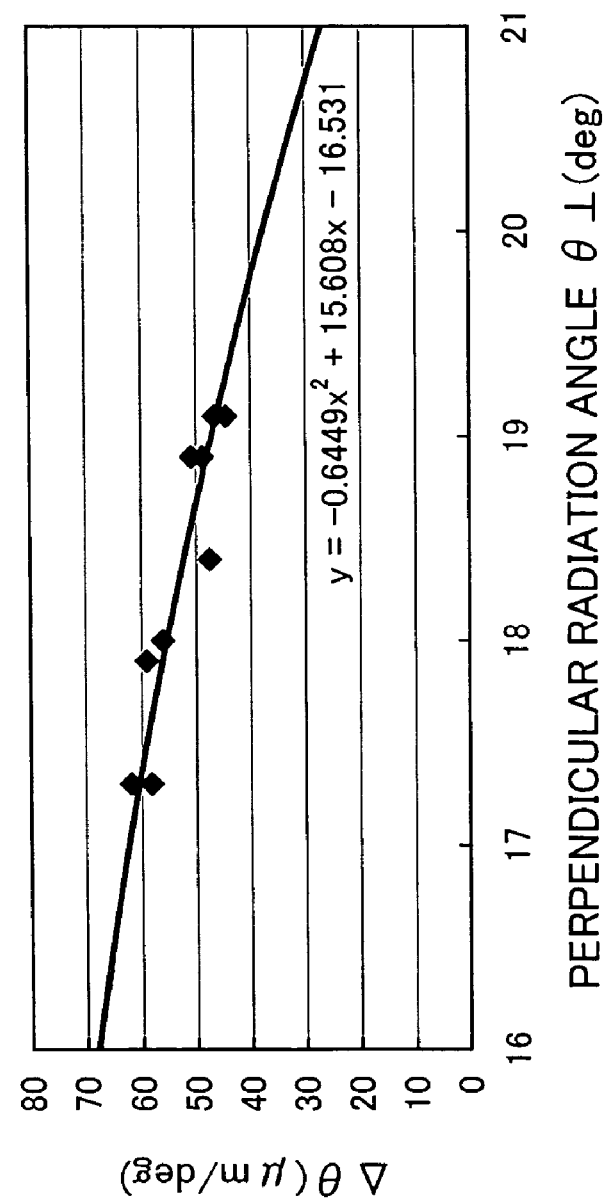
FIG. 14 is a graph showing the relationship between the perpendicular radiation angle of the DVD recording laser light and the sensitivity, to the emission angle, of the deviation of the gravity center of the intensity of the light exiting from the objective lens.

Here, due to fabrication errors, the perpendicular radiation angle of the monolithic LD 6 varies from one individual LD to another. To study the effect of the perpendicular radiation angle on the sensitivity $\Delta\theta$, to the emission angle, of the deviation of the gravity center of the intensity of the light exiting from the objective lens, samples of the monolithic LD 6 with different perpendicular radiation angles were prepared, and, while the perpendicular radiation angle was varied by the use of those samples, the sensitivity $\Delta\theta$, to the emission angle, of the deviation of the gravity center of the intensity of the light exiting from the objective lens was measured in the same manner as described above. FIG. 14 is a graph showing the results obtained as the radiation angle of the DVD recording laser light (with an output of 135 [mW]) was varied from 17.3 to 19.1 [deg]. The curve shown here is a regression curve of the results. As this graph shows, the sensitivity $\Delta\theta$, to the emission angle, of the deviation of the gravity center of the intensity of the light exiting from the objective lens does vary as the perpendicular radiation angle $\theta\bot$ varies. This is because, as the perpendicular radiation angle varies, the shape of the light intensity distribution in the direction perpendicular to the active layer 11 of the monolithic LD 6 and the shape of the light intensity distribution immediately after exiting from the objective lens 24 as narrowed around the peak value of the light intensity distribution also vary.

Next, with the above-mentioned test-fabricated samples of the optical system, the sensitivity Kp of the deviation of the light reception balance to the deviation of the photodetective portion was measured. Specifically, with the photodetective portion irradiated with a spot, while the photodetector 27 is moved in the Y-axis direction, the light reception balance given by formula (1) or (2) above is measured, and the ratio of the variation of the light reception balance to the amount of movement of the photodetector 27 was calculated. Here, from the monolithic LD 6 was emitted, at a time, the DVD recording laser light (with an output of 135 [mW] and a perpendicular radiation angle of 18 to 21 [deg]) and, at another time, the CD playback laser light (with an output of 8 [mW] and a perpendicular radiation angle of 27 to 36 [deg]), and the sensitivity of the deviation of the light reception balance to the deviation of the photodetective portion was measured in the DVD photodetective portion 30 and in the CD photodetective portion 33. The results were $Kpd_1=1.97$ [%/μm] and $Kpd_2=1.75$ [%/μm], indicating that almost no variation due to the variation of the perpendicular radiation angle was observed.

Next, assuming that an adjustment is made by moving the photodetector 27 so that the light reception balance in the DVD photodetective portion 30 equals zero, based on the parameters measured as described above, the specification of the error of the emission direction in each emitting portion of the monolithic LD 6 is determined so as to fulfill formula (3) above. The parameters used in this determination are listed in Table 1. Here, with respect to the DVD recording laser light, assuming that the monolithic LD 6 used was fabricated with fabrication errors such that the DVD-side vertical radiation angle varied between 18 to 21 [deg], and according to the regression curve described previously and shown in FIG. 14, the sensitivity $\Delta\theta_1$, to the emission angle, of the deviation of the gravity center of the intensity of the light exiting from the objective lens was assumed to vary between 26.4 to 53.9 [μm/deg]. On the other hand, with respect to the CD playback laser light, assuming that the monolithic LD 6 used was fabricated with fabrication errors such that the CD-side vertical radiation angle varied between 27 to 36 [deg], while the perpendicular radiation angle of the CD playback laser light was varied between 27 and 36 [deg], the sensitivity $\Delta\theta_2$, to the emission angle, of the deviation of the gravity center of the intensity of the light exiting from the objective lens was measured, and, since $\Delta\theta_2$ did not vary so much as with the DVD recording laser light, its average value 11.0 [μm/deg] was used. For higher precision, the variation of $\Delta\theta_2$ may be taken into consideration.

TABLE 1

| | DVD | | CD | |
|---|---|---|---|---|
| | Unit | Value | Unit | Value |
| $\Delta\theta_1$ | μm/deg | 24.6-53.9 | $\Delta\theta_2$ | μm/deg | 11 |
| $Dpd_1$ | mm | 0.1 | $Dpd_2$ | mm | 0.08 |
| $Dob_1$ | mm | 4 | $Dob_2$ | mm | 3.14 |
| $Kpd_1$ | %/μm | 1.97 | $Kpd_2$ | %/μm | 1.75 |

In this way, with consideration given to the variation of the sensitivity $\Delta\theta_1$, to the emission angle, of the deviation of the gravity center of the intensity of the light exiting from the objective lens corresponding to the DVD recording laser light, the specification of the error of the emission direction in each emitting portion of the monolithic LD 6 is determined so as to fulfill formula (3) above. Here, each emission angle is expressed as the sum of the error of the emission direction of the emitting portion of the monolithic LD 6 and the error in the fitting of the monolithic LD 6 itself attributable to errors in the submount 5, the stem 3, etc., and is given by formula (6) below.

$$\Delta\theta\bot_i = \Delta\theta\bot_{Li} + \Delta\theta\bot_M \text{ (where i=1 or 2)} \quad (6)$$

where $\Delta\theta\bot_{Li}$ represents the error in the emission direction of the emitting portion of the monolithic LD, and $\Delta\theta\bot_M$ represents the error in the fitting of the monolithic LD.

Here, it is assumed that the error in the fitting of the monolithic LD is controlled within a variation of ±0.5 [deg] ($\Delta\theta\bot_M$=-0.5 to 0.5 [deg]), and, with consideration given to the variation of the sensitivity $\Delta\theta_1$, to the emission angle, of the deviation of the gravity center of the intensity of the light exiting from the objective lens corresponding to the DVD recording laser light, the specification of the error of the emission direction of each emitting portion of the monolithic LD 6 is determined so as to fulfill formula (3) above, specifically such that DVD-side $\Delta\theta\bot_{L1}$=-2.0 to 1.0 [deg] and CD-side $\Delta\theta\bot_{L2}$=-2.5 to 2.5 [deg]. By the use of a monolithic LD given such a specification in terms of the error in the emission direction of each emitting portion, when $\Delta\theta\bot_1 = \Delta\theta\bot_{L1} + \Delta\theta\bot_M$=-2.0-0.5=-2.5 [deg], $\Delta\theta\bot_2 = \Delta\theta\bot_{L2} + \Delta\theta\bot_M$=2.5-0.5=2.0 [deg], and $\Delta\theta_1$=53.9 [μm/deg], the left side of formula (3) above equals its maximum value, namely 6.9 [%], and thus formula (3) is always fulfilled.

Thus, even when the error in the emission direction of each emitting portion of a monolithic LD or the error in the fitting of the monolithic LD itself varies, and thus the perpendicular radiation angle of DVD recording laser light varies, and as a result the sensitivity $\Delta\theta_1$, to the emission angle, of the deviation of the gravity center of the intensity of the light exiting from the objective lens varies, so long as the photodetector 27 is adjusted by being moved so that the light reception balance in the DVD photodetective portion 30 equals zero, the remnant light reception balance deviation always falls within the tolerable range. Thus, it is possible to greatly reduce the number of optical pickups that are evaluated as defective, leading to enhanced yields. Moreover, there is no need to perform adjustment other than that of the position of the photodetector to bring the remnant light reception balance deviation exceeding the tolerable range to within the tolerable range, leading to lower cost.

In a case where the photodetector 27 is adjusted by being moved so that the light reception balance in the CD photodetective portion 33 equals zero, instead of formula (3), formula (4) above is used to determine the specification of the error in the emission direction of each emitting portion of the monolithic LD 6.

Although the above description deals with a monolithic LD that emits laser light for recording to a DVD and laser light for playback from a CD, it should be understood that the present invention is applicable to a monolithic LD that emits laser light for recording from both emitting portions. In this case, the variation, resulting from the variation of the perpendicular radiation angle, of the sensitivity, to the emission angle, of the deviation of the gravity center of the intensity of the light exiting from the objective lens is measured and considered with respect to both laser beams (the variation of both $\Delta\theta_1$ and $\Delta\theta_2$ is taken into consideration).

Needless to say, the present invention is applicable to any types of discs other than DVDs and CDs.

What is claimed is:

1. A method for determining a specification of an error of an emission direction in each emitting portion of a monolithic laser diode used in an optical pickup, the optical pickup including:

the monolithic laser diode that emits
   a first light beam for recording to a disc and
   a second light beam for playing back from a disc or for recording to a disc;
a substrate;
a first photodetective portion provided on the substrate for receiving the first light beam;
a second photodetective portion provided on the substrate for receiving the second light beam; and
an objective lens,
the method comprising:

a step of determining light beam diameters immediately after the first and second light beams exit from the objective lens;
a step of determining beam spot diameters in the first and second photodetective portions;
a step of determining, with respect to the first light beam, a variation in sensitivity, to emission angle, of a deviation of a gravity center of intensity of light exiting from the objective lens;
a step of determining, with respect to the second light beam, sensitivity or a variation therein, to emission angle, of a deviation of a gravity center of intensity of light exiting from the objective lens;
a step of determining, with respect to each of the first and second light beams, sensitivity of a deviation of light reception balance to a deviation of the photodetective portion; and
a step of determining the specification of the error of the emission direction in each emitting portion of the monolithic laser diode such that at least one of formulae (A) and (B) is fulfilled, based on the light beam diameters immediately after exiting from the objective lens, the beam spot diameters in the photodective portions, the variation in sensitivity, to emission angle, of the deviation of the gravity center of the intensity of light exiting from the objective lens with respect to the first light beam, the sensitivity or variation therein, to emission angle, of the deviation of the gravity center of the intensity of light exiting from the objective lens with respect to the second light beam, and the sensitivity of the deviation of the light reception balance to the deviation of the photodetective portion thus determined;

$$|(\Delta\theta\perp_1 \times \Delta\theta_1 \times Dpd_1/Dob_1 - \Delta\theta\perp_2 \times \Delta\theta_2 \times Dpd_2/Dob_2) \times Kpd_2| \leq \alpha \quad \text{(A)}$$

$$|(\Delta\theta\perp_1 \times \Delta\theta_1 \times Dpd_1/Dob_1 - \Delta\theta\perp_2 \times \Delta\theta_2 \times Dpd_2/Dob_2) \times Kpd_1| \leq \alpha \quad \text{(B)}$$

where, let variables corresponding to the first light beam be followed by a subscript "1" and variables corresponding to the second light beam be followed by a subscript "2", $\Delta\theta\perp$ represents an emission angle;
$\Delta\theta$ represents sensitivity, to the emission angle, of a deviation of a gravity center of intensity of light exiting from the objective lens;
Dob represents a diameter of the light beam immediately after exiting from the objective lens;
Dpd represents a diameter of a spot formed by the light beam on the photodetective portion;
Kpd represents sensitivity of a deviation of light reception balance to a deviation of the photodetective portion; and
$\alpha$ represents a tolerable value for a remnant deviation of light reception balance.

* * * * *